US011615609B2

(12) United States Patent
Okuno

(10) Patent No.: US 11,615,609 B2
(45) Date of Patent: Mar. 28, 2023

(54) LEARNING APPARATUS, INFERRING APPARATUS, LEARNING METHOD, PROGRAM, AND INFERRING METHOD

(71) Applicant: AXELL CORPORATION, Tokyo (JP)

(72) Inventor: Shuji Okuno, Nara (JP)

(73) Assignee: Axell Corporation, Tokyo (JP)

( * ) Notice: Subject to any disclaimer, the term of this patent is extended or adjusted under 35 U.S.C. 154(b) by 392 days.

(21) Appl. No.: 16/917,356

(22) Filed: Jun. 30, 2020

(65) Prior Publication Data

US 2021/0004699 A1    Jan. 7, 2021

(30) Foreign Application Priority Data

Jul. 1, 2019  (JP) .............................. JP2019-123289
Apr. 28, 2020 (JP) .............................. JP2020-079462

(51) Int. Cl.
*G06N 20/20* (2019.01)
*G06V 10/75* (2022.01)

(52) U.S. Cl.
CPC ........... *G06V 10/751* (2022.01); *G06N 20/20* (2019.01)

(58) Field of Classification Search
CPC .... G06V 10/751; G06V 10/764; G06V 10/82; G06N 20/20; G06N 3/08; G06N 3/0454
USPC .......................................................... 706/46
See application file for complete search history.

(56) References Cited

U.S. PATENT DOCUMENTS

| 10,320,569 | B1 * | 6/2019 | Wentz .................. H04L 9/3239 |
| 11,449,611 | B2 * | 9/2022 | Schat ..................... G06N 20/00 |
| 2016/0180195 | A1 | 6/2016 | Martinson et al. |
| 2018/0068426 | A1 | 3/2018 | Matsunaga |
| 2018/0302614 | A1 | 10/2018 | Toksvig et al. |
| 2019/0138899 | A1 | 5/2019 | Hoshizuki et al. |

FOREIGN PATENT DOCUMENTS

| JP | 2017146957 A | 8/2017 |
| JP | 2018038789 A | 3/2018 |
| JP | 2019087072 A | 6/2019 |

* cited by examiner

*Primary Examiner* — Charlotte M Baker
(74) *Attorney, Agent, or Firm* — Masuvalley & Partners; Peter R. Martinez

(57) ABSTRACT

A learning apparatus that can realize efficient machine learning is provided.
A learning apparatus that learns a set value in a machine learning model based on predetermined image data for learning includes an inverting unit that inverts data of at least a part of respective channels in the image data for learning, an input unit that inputs the inverted data to the machine learning model, an output unit that can compare data obtained by inverting data output from the machine learning model with training data, and/or data output from the machine learning model with data obtained by inverting training data, and a learning process executing unit that learns the set value according to a result of the comparison.

9 Claims, 15 Drawing Sheets

LEARNING APPARATUS, INFERRING APPARATUS, LEARNING METHOD, PROGRAM, AND INFERRING METHOD

RELATED APPLICATIONS

This application claims priority to Japanese Patent Application No. JP2019-123289 filed Jul. 1, 2019, and to Japanese Patent Application No. JP2020-079462 filed Apr. 28, 2020, both of which are hereby incorporated herein by reference in their entireties.

FIELD

The present invention relates to a learning apparatus and an inferring apparatus using a machine learning model, and particularly to a learning apparatus and an inferring apparatus using a machine learning model for image processing.

BACKGROUND

Conventionally, a technique for generating a learned model by machine learning has been known. In the machine learning, a learned model is generated by providing a plurality of images that become training data to a computer program and learning a parameter of the program. By using the learned model, image processing can be performed with respect to an arbitrary image.

Parameter learning of the program is generally performed by inputting an image to a machine learning model and acquiring an image from an output of the machine learning model, to calculate a parameter of the machine learning model so that an error between an input image and an output image becomes minimum. By using the "learned model" learned in this manner, for example, an arbitrary low-resolution image is input to the learned model and a high-resolution image can be output as inferred data.

In recent years, of machine learning, machine learning using a neural network has been applied to many fields. Particularly, in the fields of image recognition and speech recognition, deep learning that uses neural network in a multi-layer structure is exhibiting high recognition accuracy. In the deep learning, a representative model of a convolutional neural network (CNN) uses a convolutional layer and a pooling layer plural times. The convolutional layer is used for extracting an input feature, and the pooling layer is used for condensing data, while keeping information regarding the extracted feature.

In the image processing using the neural network, the number of channels to be input and output with respect to a learning model is normally fixed. This is because a color expression method is set in the image data, such as RGB, gray scale, YCbCr, and CMYK. In the machine learning using the image data, it is general to prepare a plurality of channels according to a data format of the image data to be input and to input data to each channel.

For example, as image processing using the neural network, there are image processing described in Japanese Patent Application Laid-open No. 2019-87072 and image processing described in Japanese Patent Application Laid-open No. 2018-38789.

Patent Literature 1: Japanese Patent Application Laid-open No. 2019-87072
Patent Literature 2: Japanese Patent Application Laid-open No. 2018-38789

Image data to be input in the image processing using the machine learning is generally expressed in RGB, YCbCr, or the like. However, for example, image data generated by computer graphics and the like or image data generated by image editing software may have an alpha channel (an alpha value) other than the color information such as RGB.

The alpha channel is generally image auxiliary data that expresses opacity of a pixel. For example, in a case where the alpha channel is in a value range of "0 to 1", 0 expresses completely transparent and 1 expresses completely opaque. When the alpha value is expressed by, for example, 8 bits, a completely transparent pixel has 0, and a completely opaque pixel has 255. Meanwhile, when RGB data is expressed by 8 bits, a color component has 0 to 255 values same as the alpha value. However, as the color component becomes stronger, it has a larger value.

Therefore, alpha channel data often becomes image data, which looks like inverted in a human sense. For example, as illustrated in FIG. 14A, a case in which an image is expressed in black on a white background is assumed. In this case, data of an object to be expressed (in FIG. 14A, a portion corresponding to characters of "alpha channel") is "R0, G0, B0". Meanwhile, data of a base portion other than the object is (R255, G255, B255). In a case of expressing image data by YCbCr, luminance of object data is 0, and luminance of the base portion is 255.

Meanwhile, when the same image is expressed by an alpha value, pixel data of an object expressed as illustrated in FIG. 14B (in FIG. 14B, a portion corresponding to characters of "alpha channel") becomes 255 (opaque), and pixel data of the base portion other than the object becomes 0 (transparent). Therefore, the alpha channel data is perceived as inverted image data in a human sense. In the portion of the base portion that becomes transparent, since the data value is 0, it is expressed in black for illustrative purposes.

Conventionally, an image with an alpha channel has not been used as a material for machine learning. Therefore, when the image with an alpha channel is an object of machine learning, generally, the alpha channel is ignored and only the image data is learned, or the alpha value is separated from pixel data (RGB or the like), so that the alpha value is learned and inferred by using a machine learning model for 1 channel for gray scale, and the image data is learned and inferred by using a machine learning model, for example, for 3 channels. Alternatively, such a method is also being used that the alpha value is copied for a plurality of channels, for example, for three channels, and the copied alpha values are input to a machine learning model for learning and inferring the pixel data.

However, as described above, the alpha channel data is an inverted image in a human sense, and has an occurrence tendency numerically different from that of normal image data. For example, an occurrence rate of a pixel value (a luminance value) and the alpha value in a character and the background tends to have an inverted characteristic as illustrated in FIG. 15. That is, in a case where a character is expressed in black on a white background, the luminance value of a portion corresponding to the character has a high occurrence rate of data near 0, and the luminance value of the background has a high occurrence rate of data near 255. Meanwhile, regarding the alpha value, the alpha value of the portion corresponding to the character has a high occurrence rate of data near 255, and the alpha value of the background has a high occurrence rate of data near 0.

In this manner, even if the alpha channel data with inverted characteristics is input to the learned machine learning model for pixel data by using the machine learning model for one channel for gray scale and pixel data to perform inference, there is a problem in that the image quality after the processing deteriorates. Further, in the image processing described in the patent literatures described above, such a property of the alpha channel has not been taken into consideration.

The present invention has been achieved in view of the problems described above, and an object of the present invention is to provide a learning apparatus and an inferring apparatus that can realize efficient processing of an image with an alpha channel in image processing by machine learning such as a convolutional neural network.

SUMMARY OF THE INVENTION

A learning apparatus according to the present invention is a learning apparatus that learns a set value in a machine learning model based on predetermined image data for learning, and comprises: an inverting unit that inverts data of at least a part of respective channels in the image data for learning; an input unit that inputs the inverted data to the machine learning model; an output unit that can compare data obtained by inverting data output from the machine learning model with training data, and/or data output from the machine learning model with data obtained by inverting training data; and a learning process executing unit that learns the set value according to a result of the comparison.

According to the present invention, a learning apparatus and an inferring apparatus that can realize efficient processing of an image with an alpha channel in image processing by machine learning such as a convolutional neural network can be provided.

DESCRIPTION OF EMBODIMENTS

First Embodiment

Figure 1:
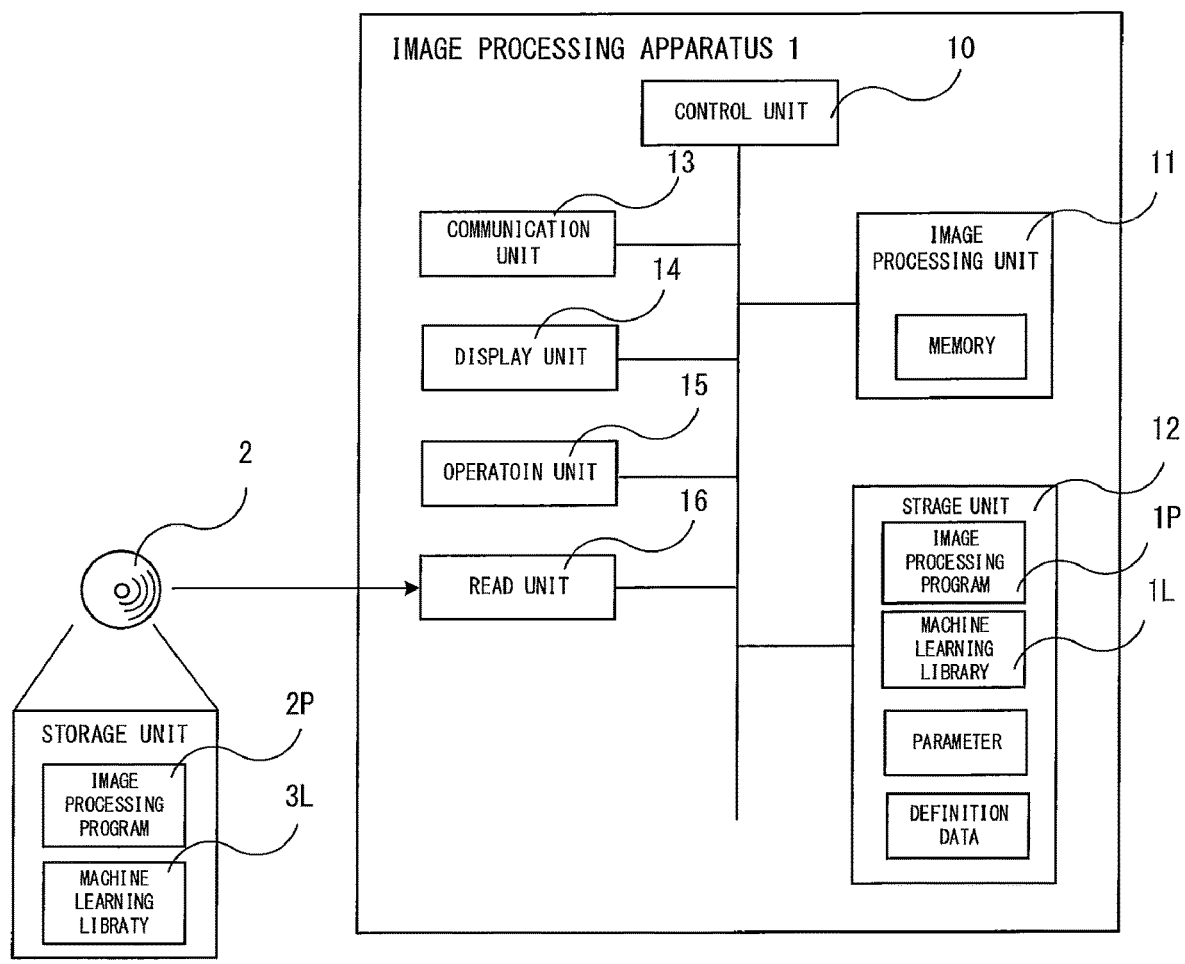
FIG. 1 is a block diagram illustrating a configuration of an image processing apparatus according to a first embodiment of the present invention.

An image processing apparatus according to a first embodiment of the present invention is described with reference to FIG. 1 to FIG. 3. In the first embodiment, the image processing apparatus exerts a function as at least one of a learning apparatus that learns a set value in a machine learning model based on predetermined image data for learning such as image data with an alpha channel, and an inferring apparatus that performs a predetermined inferring process with respect to target image data by using a machine learning model.

The alpha channel is image auxiliary data provided separately from color expression data with respect to each pixel in the image processing field, and generally expresses opacity of the pixel. The alpha channel is used for masking of an image, synthesizing a plurality of images, and the like.

<Image Processing Apparatus>

First, respective processing units provided in an image processing apparatus 1 are described with reference to FIG. 1. The image processing apparatus 1 includes, as illustrated in FIG. 1, a control unit 10, an image processing unit 11, a storage unit 12, a communication unit 13, a display unit 14, an operation unit 15, and a read unit 16. The image processing apparatus 1 and operations in the image processing apparatus 1 are described below as one server computer. However, a configuration may be employed in which the image processing is performed by a plurality of computers in a distributed manner.

The control unit 10 controls component parts of the apparatus by using a processor such as a CPU and a memory to realize various functions. The image processing unit 11 performs image processing in response to a control instruction from the control unit 10 by using a processor such as a CPU or a dedicated circuit and a memory. The control unit 10 and the image processing unit 11 may be configured as one piece of hardware (SoC: System on a Chip) in which the processor such as a CPU or a GPU, a memory, and further, the storage unit 12 and the communication unit 13 are integrated.

As the storage unit 12, a hard disk or a flash memory is used. The storage unit 12 stores therein an image processing program 1P and a machine learning library 1L that exerts a function as a machine learning model (for example, a CNN). The storage unit 12 also stores therein definition data that defines the machine learning model, and parameters including a set value and the like in the learned machine learning model.

The communication unit 13 is a communication module that realizes communication connection to a communication network such as the Internet. The communication unit 13 uses a network card, a wireless communication device, or a carrier communication module.

The display unit 14 uses a liquid crystal panel, an organic EL (Electro Luminescence) display, or the like. The display unit 14 can display an image by the processing in the image processing unit 11 according to an instruction of the control unit 10.

The operation unit 15 includes a user interface such as a keyboard or a mouse. A physical button provided in a casing may be used. A software button displayed on the display unit 14 may be used. The operation unit 15 notifies the control unit 10 of operation information of a user.

The read unit 16 can read an image processing program 2P and a machine learning library 3L stored in a recording medium 2 such as an optical disk, for example, by using a disk drive. The image processing program 1P and the machine learning library 1L stored in the storage unit 12 may be obtained by replicating the image processing program 2P and the machine learning library 3L read by the read unit 16 from the recording medium 2 by the control unit 10.

<Image Processing Function at Time of Learning>

Next, functions of the image processing apparatus 1 are described with reference to the drawings. The image data having three channels is described by citing RGB as an example. However, the image data may have another image data format such as YCbCr.

Learning by Image Data not Having Alpha Channel: First Embodiment

Figure 2:
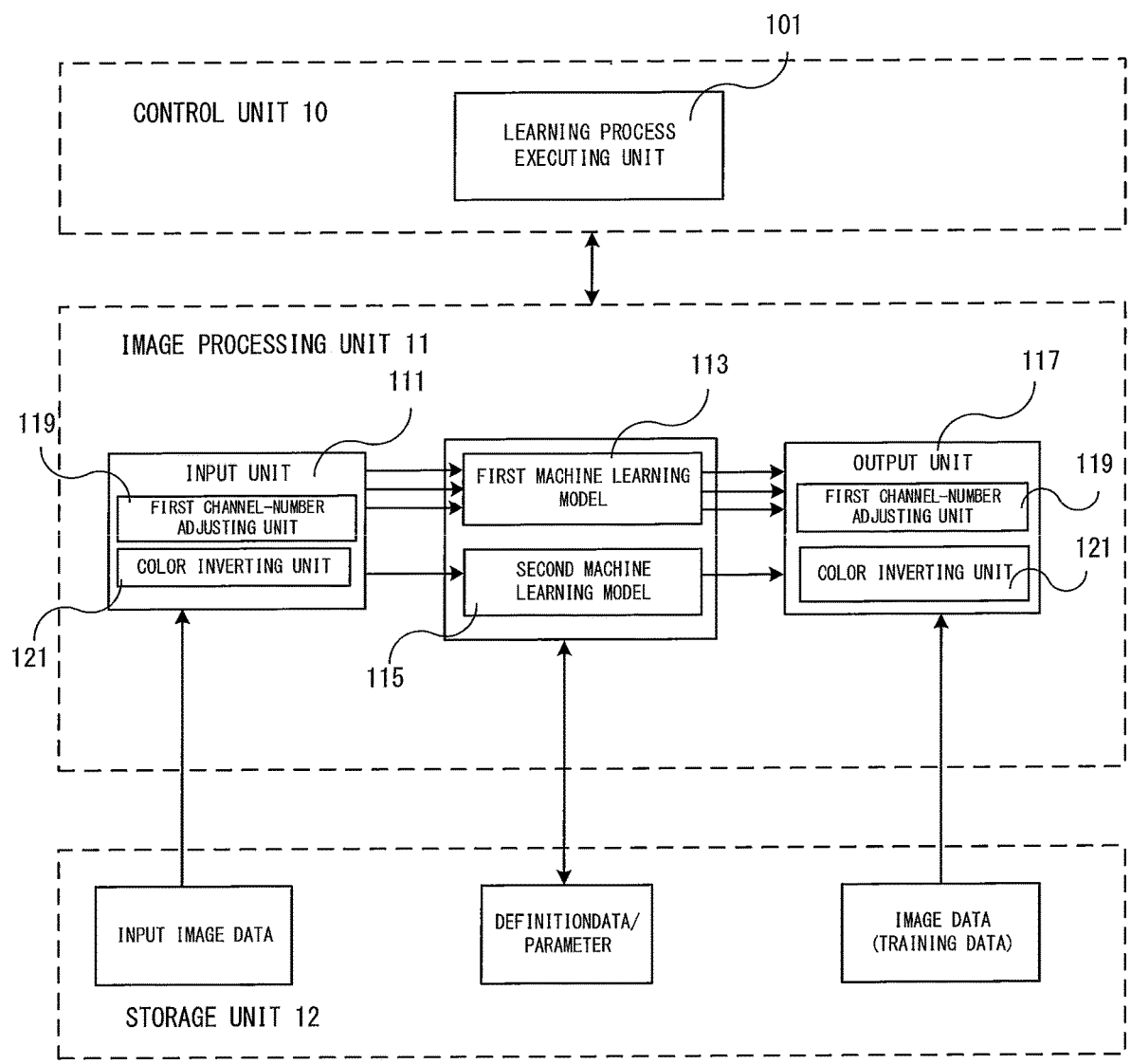
FIG. 2 is a functional block diagram of the image processing apparatus according to the first embodiment of the present invention.

FIG. 2 is a functional block diagram of the image processing apparatus according to the first embodiment. FIG. 3 is a diagram illustrating an entire flow of machine learning, and FIG. 4 is a diagram illustrating a detailed flow of machine learning according to the first embodiment.

First, the control unit 10 of the image processing apparatus 1 includes a learning process executing unit 101. The learning process executing unit 101 configures functions of an input unit 111, a first machine learning model 113, a second machine learning model 115, and an output unit 117 in the image processing unit 11, based on the machine learning library 1L, the definition data, and parameter information stored in the storage unit 12. Further, the input unit 111 and the output unit 117 includes functions of a first channel-number adjusting unit 119 and a color inverting unit 121. The first machine learning model 113 and the second machine learning model 115 may be collectively referred to as "machine learning model".

Figure 3:
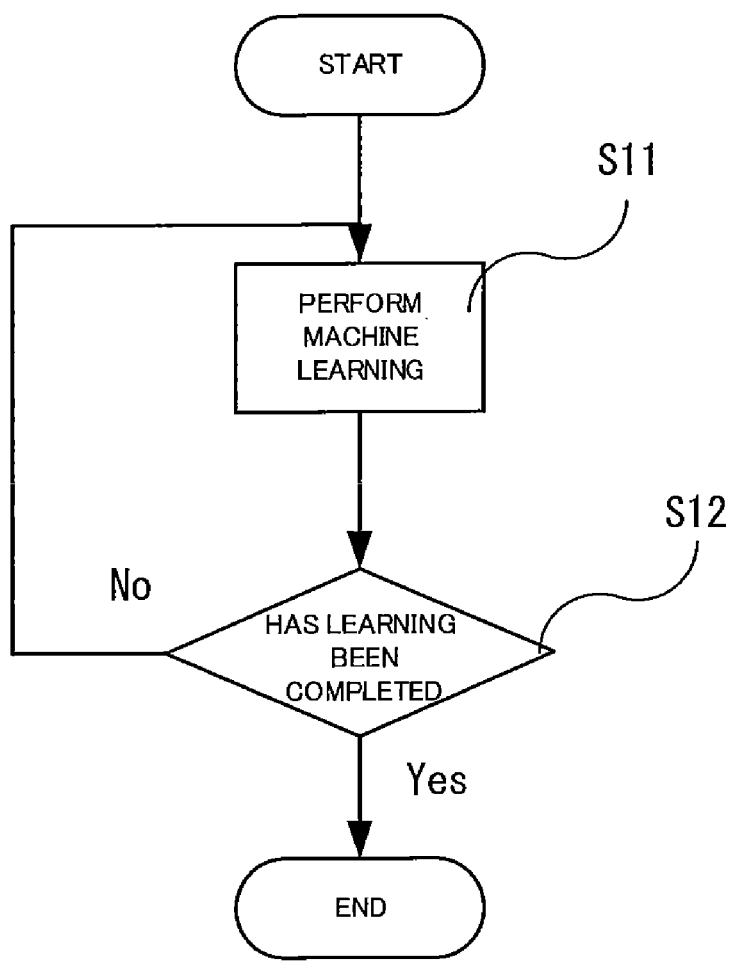
FIG. 3 is a diagram illustrating an entire flow of machine learning.
Figure 4:
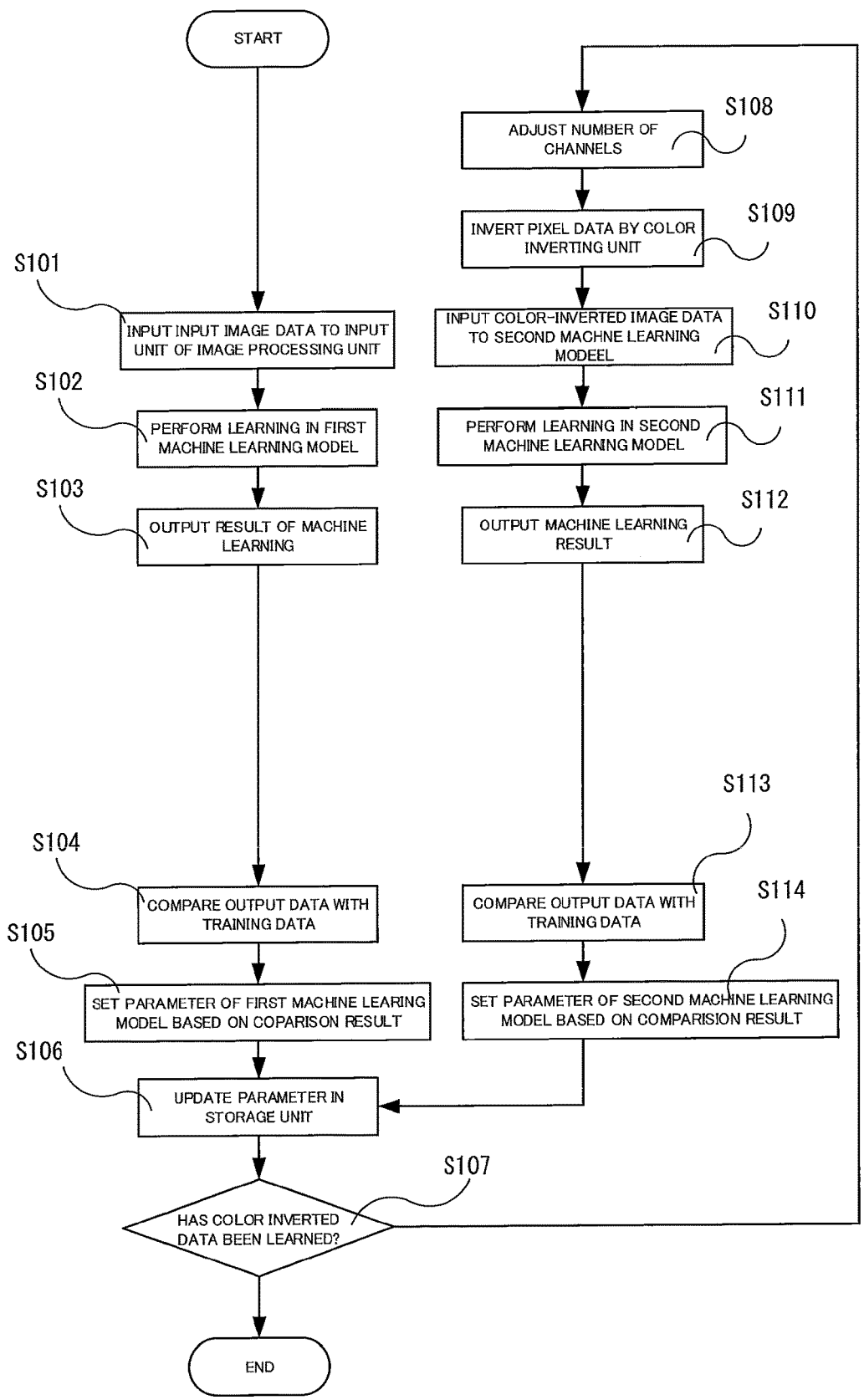
FIG. 4 is a diagram illustrating a detailed flow of machine learning according to the first embodiment.

The learning process executing unit 101 uses a machine learning model as a learning object to perform a process to learn a set value (a parameter or the like) in the machine learning model as a learning object, based on image data for learning (FIG. 3, Step S11).

Details of the machine learning at Step S11 are described with reference to FIG. 4. The input unit 111 of the image processing unit 11 receives input image data (for example, RGB data) of an image for learning (Step S101), and supplies pixel data of the input image data to the first machine learning model 113 to perform machine learning (Step S102). In a case where the first machine learning model 113 is a CNN, the first machine learning model 113 may include a plurality of stages of convolutional layers and pooling layers defined by the definition data, and a fully connected layer. According to this configuration, a feature amount of the input image data is extracted in the first machine learning model 113, image processing is performed based on the extracted feature amount, and an image processing result is output to the output unit 117 as a learning result (output image data) (Step S103).

The output unit 117 compares the image processing result input from the first machine learning model 113 with image data as training data (Step S104). Further, the output unit 117 sets a parameter of the first machine learning model 113 based on a comparison result (Step S105). The parameter setting is a process to minimize a difference between input data and answer data, for example, by updating the parameter according to a mini-batch gradient descent method or the like. The updated set value is stored in the storage unit 12 (Step S106).

Thereafter, the learning process executing unit 101 determines whether color inverted data has been learned (Step S107). When learning of the color inverted data has not been performed (No at Step S107), the learning process executing unit 101 causes the first channel-number adjusting unit 119 to group together pieces of the input pixel data in one channel (Step S108). The learning process executing unit 101 causes the color inverting unit 121 to perform color inversion of the pixel data grouped together in one channel (Step S109). The color-inverted pixel data is input to the second machine learning model 115 (Step S110). Thereafter, machine learning is performed in the second machine learning model 115 by using the image data, and a machine learning result is output (Steps S111, S112).

The first channel-number adjusting unit 119 has a function of grouping together pieces of three-channel data in one-channel. Specifically, in a case where the input image data is RGB data, the first channel-number adjusting unit 119 sets a mean value of a maximum value and a minimum value of three pieces of pixel data (pixel values) of red (R) pixel, green (G) pixel, and blue (B) pixel, as one-channel data. Alternatively, in a case where the input image data is YCbCr data, the first channel-number adjusting unit 119 adopts a luminance value Y of pixel data as data to be input to the color inverting unit 121. Further, the luminance value Y may be calculated from the RGB data and the luminance value may be used.

The color inverting unit 121 performs a process to invert gradation. For example, in a case where the input data is expressed by an 8-bit integer, the process to invert the bit may be performed, or a difference may be obtained by subtracting a pixel value from the maximum value of gradation (255 or 1).

The processing result output from the second machine learning model 115 is supplied to the output unit 117. The output unit 117 uses the pixel data of the training data to generate training data for the second machine learning model 115 acquired via the first channel-number adjusting unit 119 and the color inverting unit 121. The output unit 117 compares the training data with the output of the second machine learning model 115 (Step S113), sets a parameter of the second machine learning model 115, and updates the parameter in the storage unit 12 (Steps S114, Step S106).

Thereafter, the learning process executing unit 101 determines whether color inverted data has been learned, and when learning of the color inverted data has been completed (Yes at Step S107), the learning process executing unit 101 ends the machine learning at Step S11 in FIG. 3. After performing Step S11, the learning process executing unit 101 determines whether learning of all the pieces of input image data has been completed (FIG. 3, Step S12).

When learning of all the pieces of input image data has not been completed (No at Step S12), the learning process executing unit 101 performs the learning process described above with respect to the next input image data, to perform adjustment of the parameter of the machine learning model. Meanwhile, when the learning of all the pieces of input image data has been completed (Yes at Step S12), the learning process executing unit 101 ends the learning.

In the above descriptions, data obtained by performing color inversion with respect to image data being training data after the number of channels has been adjusted is used as the training data of the second machine learning model 115. However, the pieces of image data to be used as training data may be each color inverted, and thereafter, these pieces of color-inverted image data are grouped together in one piece of data by adjusting the number of channels, and then input to the second machine learning model 115 as training data.

Learning 1 by Image Data Having Alpha Channel: Second Embodiment

Figure 5:
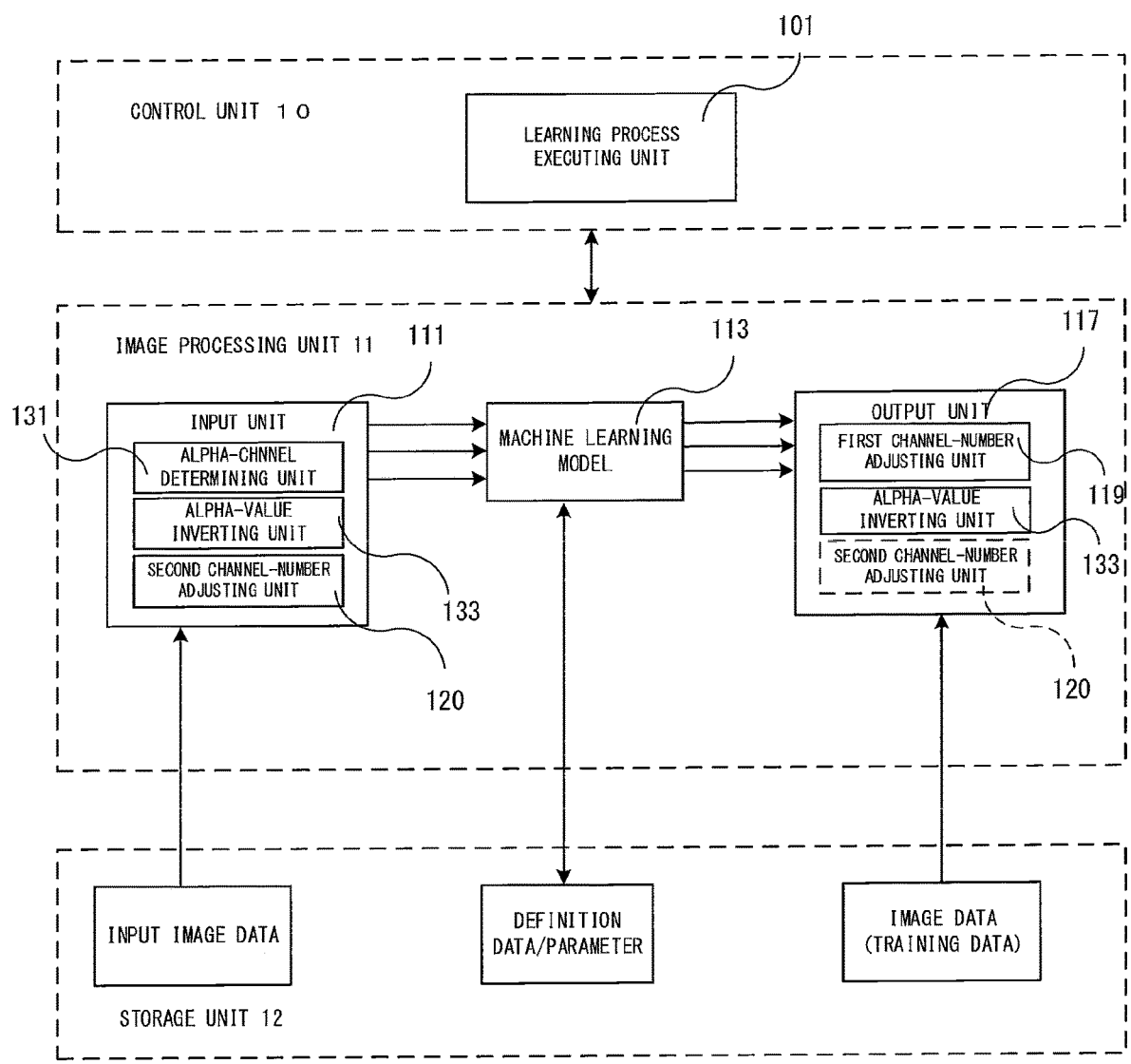
FIG. 5 is a functional block diagram of an image processing apparatus according to a second embodiment of the present invention.
Figure 6:
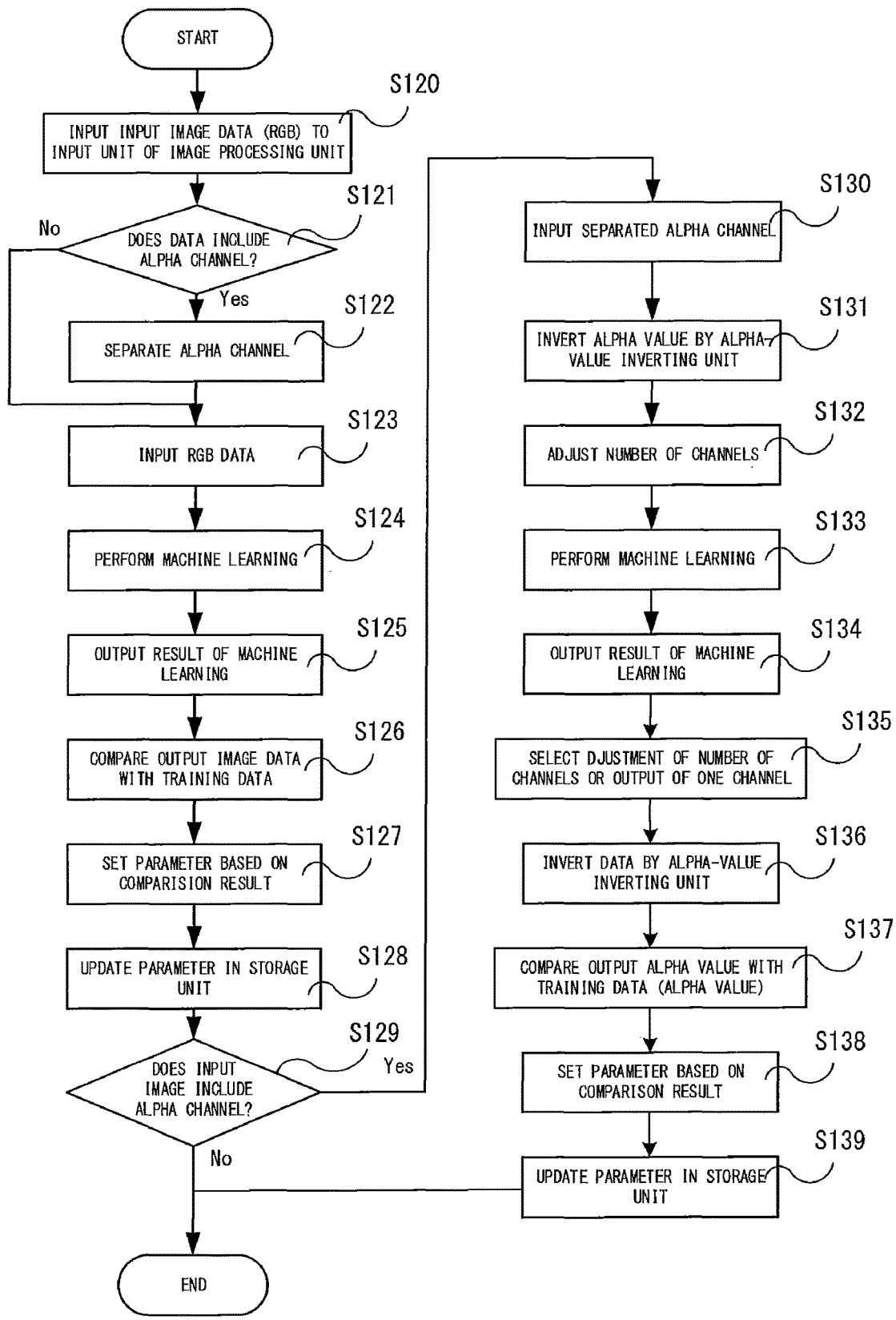
FIG. 6 is a diagram illustrating a detailed flow of machine learning according to the second embodiment.

Next, learning by using image data having an alpha channel is described with reference to FIG. 3, FIG. 5, and FIG. 6. FIG. 5 is a functional block diagram of an image processing apparatus according to a second embodiment, and FIG. 6 is a flowchart illustrating an operation of the image processing apparatus according to the second embodiment at the time of performing learning. Constituent elements identical to those of the image processing apparatus 1 according to the first embodiment described above are denoted by like reference signs, and detailed explanations thereof are omitted.

The control unit 10 of the image processing apparatus 1 includes the learning process executing unit 101. The learning process executing unit 101 configures functions of the input unit 111, the first machine learning model 113, and the output unit 117 in the image processing unit 11, based on the machine learning library 1L, the definition data, and the parameter information stored in the storage unit 12. Further, the input unit 111 includes functions of a second channel-number adjusting unit 120, an alpha-channel determining unit 131, and an alpha-value inverting unit 133. The output unit 117 includes functions of the first channel-number adjusting unit 119 and the alpha-value inverting unit 133.

The learning process executing unit 101 uses the first machine learning model 113 as a learning object to perform a process to learn a set value (a parameter or the like) in the machine learning model as a learning object, based on image data for learning (Step S11).

Details of the machine learning at Step S11 are described with reference to FIG. 6. The input unit 111 of the image processing unit 11 receives input image data for learning (for example, RGB data) input from the storage unit 12 (Step S120). The alpha-channel determining unit 131 determines whether an alpha channel is included in the input image data (Step S121). It suffices that determination of the alpha channel is performed in such a manner that it is determined whether the image data is an image with an alpha channel, for example, by reading information of a header portion or an identifier of the image data.

When the alpha channel is included in the input image data (Yes at Step S121), the input unit 111 separates alpha channel data (an alpha value) and inputs RGB pixel data to the first machine learning model 113 to perform machine learning (Steps S122, S123, S124). When the alpha channel is not included in the input image data (No at Step S121), the input unit 111 directly inputs the RGB pixel data to the first machine learning model 113 (Steps S123, S124).

Thereafter, the input unit 111 performs machine learning in the first machine learning model 113 and outputs an output from the machine learning model to the output unit 117 (Steps S124, S125). The output unit 117 compares the output from the first machine learning model 113 with image data being training data stored in the storage unit 12, sets a parameter of the first machine learning model 113 based on a comparison result, and updates the parameter in the storage unit 12 (Steps S126, S127, S128).

On the other hand, when the alpha channel is included in the input image (Yes at Step S129), the alpha channel data separated at Step S122 is input to the alpha-value inverting unit 133 of the input unit 111 (Step S130) and inverted (Step S131). The inverted alpha value is input to the second channel-number adjusting unit 120 of the input unit 111, and the number of channels is adjusted (Step S132).

It suffices that inversion of the alpha value by the alpha-value inverting unit 133 is performed in such a manner that, for example, when the alpha value is expressed by 8 bits, inverted alpha value=255−□1, assuming that an input alpha value is □1. Further, with regard to adjustment of the number of channels by the second channel-number adjusting unit 120, in a case where machine learning is to be performed with respect to image data by RGB three channels as in the second embodiment, the inverted alpha value is increased to values for three channels. Learning is then performed in the first machine learning model 113 by using the output data from the second channel-number adjusting unit 120 (Step S133).

With regard to the data to be input from the second channel-number adjusting unit 120 of the input unit 111 to the first machine learning model 113, since the same data is input to the respective channels, basically the same result is output from the first machine learning model 113 to the output unit 117. Therefore, the first channel-number adjusting unit 119 of the output unit 117 selects data output from any channel in the first machine learning model 113, or supplies a mean value of data output from the respective channels to the alpha-value inverting unit 133 of the output unit 117 (Steps S134, S135). The alpha-value inverting unit 133 (a re-inverting unit) of the output unit 117 re-inverts the input data (Step S136).

The output unit 117 compares the data supplied from the alpha-value inverting unit 133 with the training data of the alpha channel stored in the storage unit 12 (Step S137) to set a parameter based on a comparison result (Step S138). Thereafter, the parameter in the storage unit 12 is updated (Step S139). The learning process executing unit 101 judges whether machine learning (FIG. 3, Step S11) has been completed for all the pieces of input image data (FIG. 3, Step S12). When the machine learning has not been completed (FIG. 3, No at Step S12), the learning process executing unit 101 performs learning for the next input image, and when the machine learning has been completed (FIG. 3, Yes at Step S12), the learning process executing unit 101 ends the learning.

In a case where the first machine learning model 113 is a CNN, the first machine learning model 113 may include a plurality of stages of convolutional layers and pooling layers defined by the definition data, and a fully connected layer. In this configuration, a feature amount of the input image data is extracted in the first machine learning model 113, and learning is performed based on the extracted feature amount.

According to the second embodiment, the RGB image data or the like is directly input to the first machine learning model 113, and after an alpha value of the alpha channel data is inverted and the number of channels is adjusted, the alpha channel data is input to the first machine learning model 113. Therefore, even if the occurrence rates of the pixel data and the alpha channel data (an alpha value) are inverted, the data is converted to data having a similar property and learning is performed, thereby improving the learning efficiency.

In the second embodiment, at the time of inputting an inverted alpha value to the first machine learning model 113, an output of the first machine learning model 113 is subjected to adjustment of the number of channels and inversion of the alpha value, and is compared with the alpha channel data being the training data. However, the adjustment of the number of channels and the inversion of the alpha value may be performed with respect to the training data to be supplied to the output unit 117. In this configuration, since the alpha value in the output of the first machine learning model 113 does not need to be inverted, the alpha-value inverting unit 133 of the output unit 117 can be omitted.

For example, the configuration may be such that the alpha channel data being the training data is inverted by the alpha-value inverting unit 133, the inverted data is increased to pieces of data for three channels, and the pieces of data for the three channels are compared with the output of the first machine learning model 113. Further, the alpha channel data stored in the storage unit 12 may be inverted by the alpha-value inverting unit 133 and set as the training data. In this configuration, the pieces of data for three channels output from the first machine learning model 113 are grouped together in one-channel data, which is compared with the training data.

Learning 2 Image Data Having Alpha Channel:
Third Embodiment

Next, another embodiment in which learning by image data having an alpha channel is performed is described with reference to FIG. 3, FIG. 7, and FIG. 8.

Figure 7:
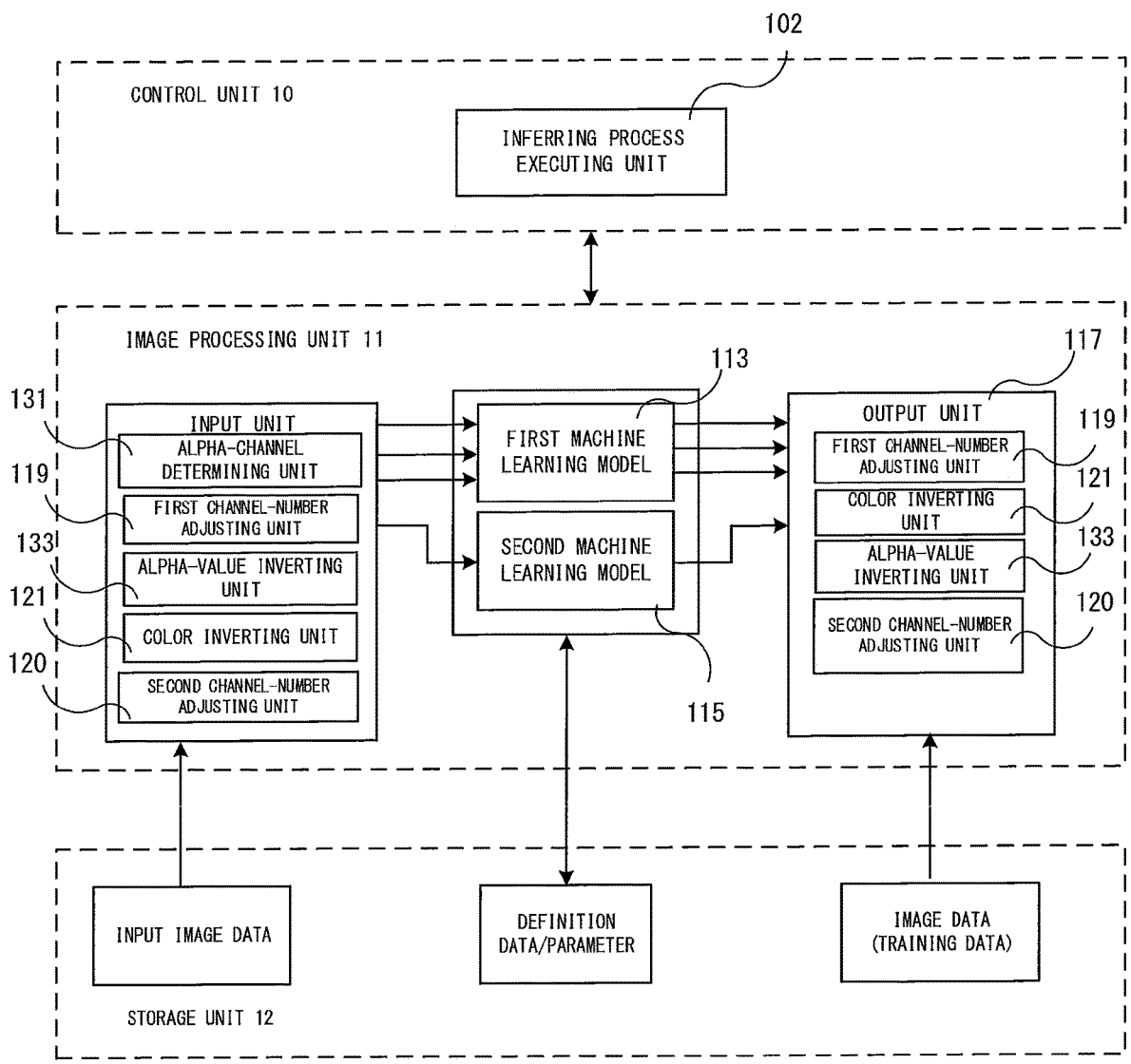
FIG. 7 is a functional block diagram of an image processing apparatus according to a third embodiment of the present invention.
Figure 8:
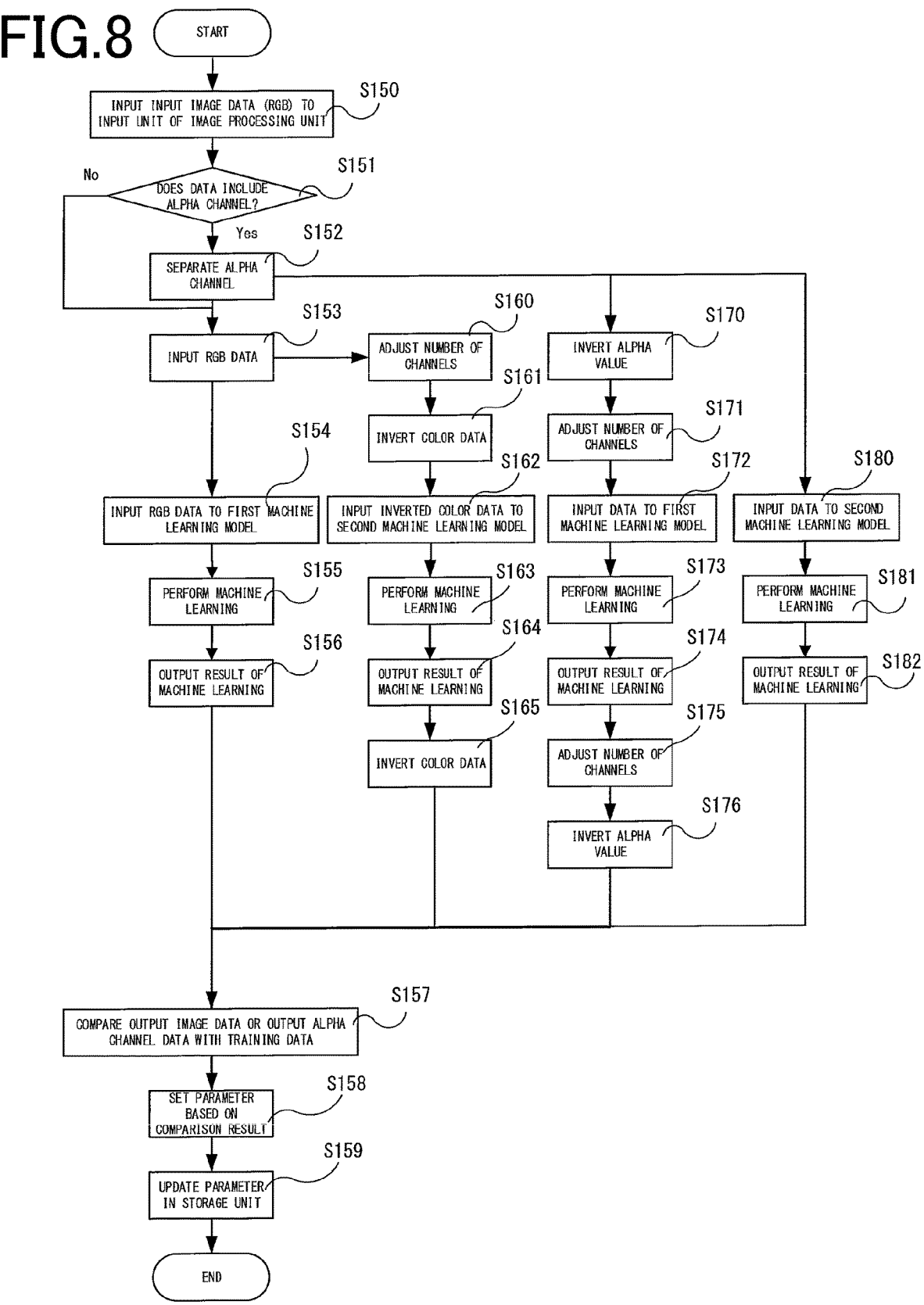
FIG. 8 is a diagram illustrating a detailed flow of machine learning according to the third embodiment.

FIG. 7 is a functional block diagram of an image processing apparatus according to a third embodiment, and FIG. 8 is a flowchart illustrating an operation at the time of performing learning by the image processing apparatus according to the third embodiment. Constituent elements identical to those of the image processing apparatus 1 according to the first and second embodiments described above are denoted by like reference signs, and detailed explanations thereof are omitted.

The control unit 10 of the image processing apparatus 1 includes the learning process executing unit 101. The learning process executing unit 101 configures functions of the input unit 111, the first machine learning model 113, the second machine learning unit 115, and the output unit 117 in the image processing unit 11, based on the machine learning library 1L, the definition data, and the parameter information stored in the storage unit 12. Further, the input unit 111 includes functions of the first channel-number adjusting unit 119, the second channel-number adjusting unit 120, a color inverting unit 121, the alpha-channel determining unit 131, and the alpha-value inverting unit 133. The output unit 117 includes functions of the first channel-number adjusting unit 119, the second channel-number adjusting unit 120, the color inverting unit 121, and the alpha-value inverting unit 133.

The learning process executing unit 101 uses the machine learning models 113 and 115 as learning objects to perform a process to learn a set value (a parameter or the like) in the machine learning models as the learning objects, based on image data for learning (FIG. 3, Step S11).

Details of the machine learning at Step S11 are described with reference to FIG. 8. The input unit 111 of the image processing unit 11 of the image processing apparatus 1 receives input image data for learning (for example, RGB data) input from the storage unit 12 (Step S150). The alpha-channel determining unit 131 determines whether an alpha channel is included in the input image data (Step S151). It suffices that determination of the alpha channel is performed in such a manner that it is determined whether the image data is an image with an alpha channel, for example, by reading information of a header portion and an identifier of the image data.

When the alpha channel is included in the input image data (Yes at Step S151), the input unit 111 separates alpha channel data (an alpha value) and inputs RGB pixel data to the first machine learning model 113 to perform machine learning (Steps S152, S153, S154, S155). When the alpha channel is not included in the input image data (No at Step S151), the input unit 111 directly inputs the RGB pixel data to the first machine learning model 113. Thereafter, machine learning is performed in the first machine learning model 113 and an output from the machine learning model is output to the output unit 117 (Steps S153, S154, S155, S156).

The output unit 117 compares the output from the first machine learning model 113 with image data being training data stored in the storage unit 12 (Step S157). The output unit 117 sets a parameter of the first machine learning model 113 based on a comparison result (Step S158), and updates the parameter in the storage unit 12 (Step S159).

Further, the extracted RGB data is integrated to one channel by the first channel-number adjusting unit 119, and then, the color data is inverted by the color inverting unit 121 and input to the second machine learning model 115 (Steps S160, S161, S162). Machine learning is performed with respect to the color-inverted data in the second machine learning model 115, and an output of the second machine learning model 115 is supplied to the output unit 117 (Steps S163, S164, S165). The output unit 117 inverts the data (Step S165), and compares the inverted data with the training data (Step S157). The output unit 117 sets a parameter of the second machine learning model 115 based on a comparison result, and updates the parameter in the storage unit 12 (Steps S158, S159). The training data to be used at this time is obtained by adjusting the number of channels in the image data stored in the storage unit 12 by the second channel-number adjusting unit 120. Further, inversion of the color data at Step S165 can be omitted, and training data having been subjected to adjustment of the number of channels and color inversion can be used.

The first channel-number adjusting unit 119 sets a mean value of a maximum value and a minimum value of the input RGB pixel data to one-channel data, or in a case where the input image data is YCbCr, adopts a luminance value Y of the pixel data. Alternatively, the first channel-number adjusting unit 119 may calculate the luminance value Y from the RGB data, and use the luminance value thereof. In this manner, both the first machine learning model 113 and the second machine learning model 115 can be learned by using the RGB data.

Meanwhile, the alpha channel data separated at Step S152 is inverted by the alpha-data inverting unit 133, separated into three channels by the second channel-number adjusting unit 120, input to the first machine learning model 113, and machine learning is performed (Steps S170, S171, S172, S173).

An output of the first machine learning model 113 is supplied to the output unit 117 (Step S174), and integrated to one channel by the first channel-number adjusting unit 119 (Step S175). Thereafter, the data integrated to one channel is subjected to data inversion in the alpha-value inverting unit 133 (the re-inverting unit) of the output unit 117 (Step S176). The output unit 117 compares an output from the alpha-value inverting unit 133 with the alpha channel data being training data stored in the storage unit 12 (Step S157). The output unit 117 sets a parameter of the first machine learning model 113 based on a comparison result (Step S158), and updates the parameter in the storage unit 12 (Step S159).

Further, the alpha channel data separated at Step S152 is directly input to the second machine learning model 115 (Step S180). In the second machine learning model 115 input with the alpha channel data, processing is performed and a processing result is output to the output unit 117 (Steps S181, S182). The output unit 117 compares an output from the second machine learning model 115 with the alpha channel data being training data stored in the storage unit 12, sets a parameter of the second machine learning model 115 based on a comparison result, and updates the parameter in the storage unit 12 (Steps S157, S158, S159).

In this manner, since the learning is performed by using the image data, the color-inverted image data, the alpha channel data, and the data-inverted alpha channel data, and data having a similar tendency of the occurrence rate to the data is input to the same machine learning model, learning can be performed efficiently.

In the third embodiment, at the time of inputting the inverted alpha value to the first machine learning model 113, the output unit 117 adjusts the number of channels and inverts the alpha value with respect to the output of the first machine learning model 113, and compares the output with the alpha channel data being the training data. However, adjustment of the number of channels and inversion of the alpha value may be performed with respect to the output of the first machine learning model, or with respect to the training data supplied to the output unit 117.

That is, the configuration may be such that the alpha channel data being training data is inverted by the alpha-value inverting unit 133, the inverted data is increased to pieces of data for three channels by the second channel-number adjusting unit 120, and the three-channel data is compared with the output of the first machine learning model 113. Further, the configuration may be such that the output of the first machine learning model 113 is adjusted by the first channel-number adjusting unit 119 of the output unit 117 to acquire one-channel data, and the alpha channel data being training data is inverted by the alpha-value inverting unit 133, and the inverted training data is compared with the output of the first channel-number adjusting unit 119.

Among the hardware configurations of the image processing apparatus 1 according to the first, second, and third embodiments, the communication unit 13, the display unit 14, the operation unit 15, and the read unit 16 are not essential. The communication unit 13 is not used in some cases, after being used once, for example, at the time of acquiring the image processing program 1P and the machine learning library 1L stored in the storage unit 12 from an external server apparatus. Similarly, there is a possibility that the read unit 16 is not used after the image processing program 1P and the machine learning library 1L are read and acquired. The communication unit 13 and the read unit 16 may be the same device using serial communication such as a USB.

The image processing apparatus 1 may have a configuration as a Web server to provide the respective functions described above to a Web client apparatus including a display unit and a communication unit. In this case, the communication unit 13 is used to receive a request from the Web client apparatus and transmit a processing result.

As an error to be used at the time of learning, an appropriate function according to data to be input and output and a learning object is preferably used, such as a square error, an absolute value error, or a cross entropy error. For example, when an output is classification, the cross entropy error is used. The appropriate function is not limited to the error function, and flexible operation can be applied, for example, by using other standards. Evaluation may be performed by using an external machine learning model for the error function itself.

<Image Processing Function at Time of Performing Inference>

Functions of the image processing apparatus 1 at the time of performing inference are described next with reference to the drawings. Three-channel RGB data is described as an example of image data. However, the image data may have another image data format such as YCbCr.

Inference Using Machine Learning Model of First Embodiment and Third Embodiment

Figure 9:
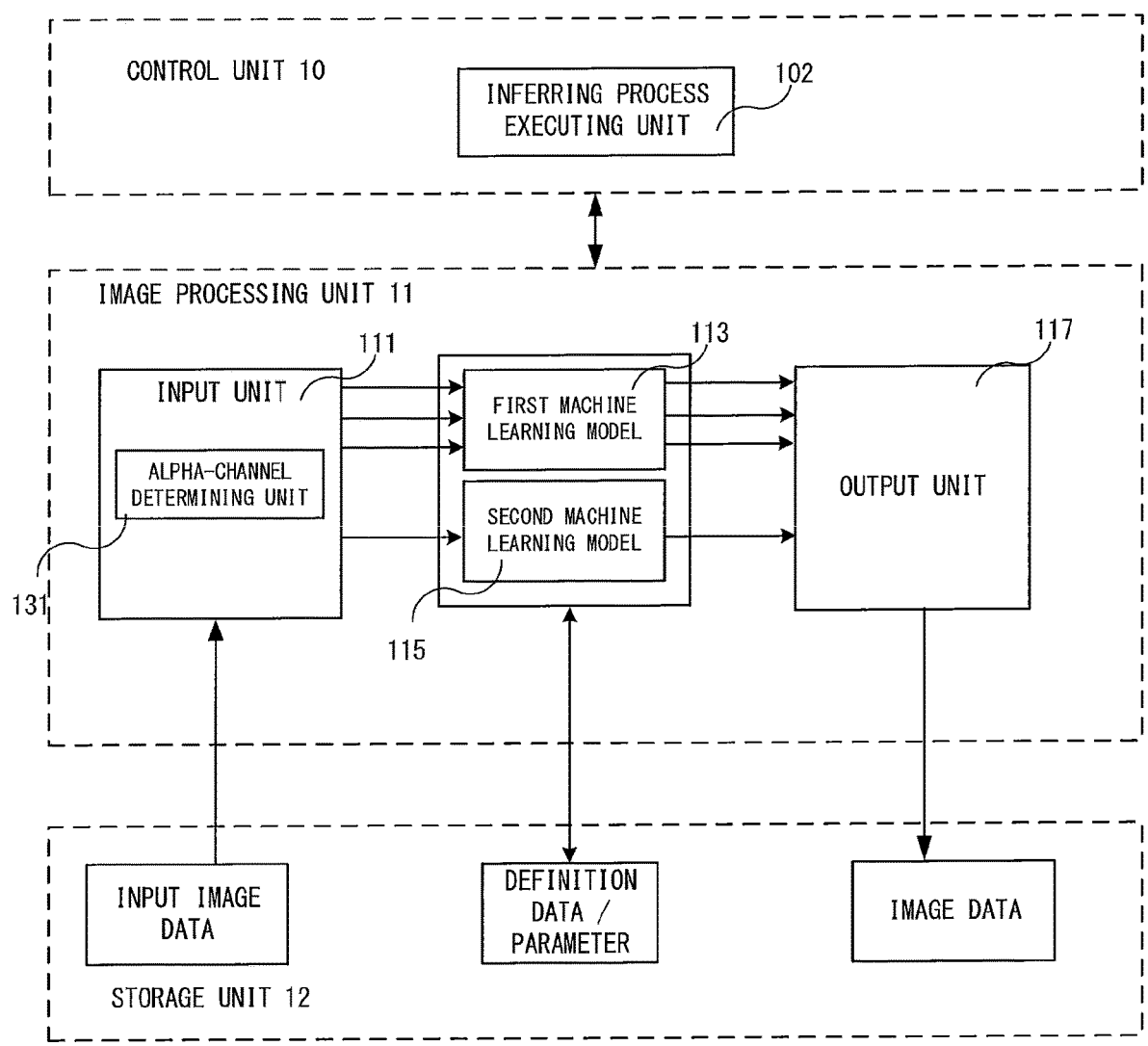
FIG. 9 is a functional block diagram at the time of performing inference by using machine learning models shown in FIG. 2 and FIG. 7.
Figure 10:
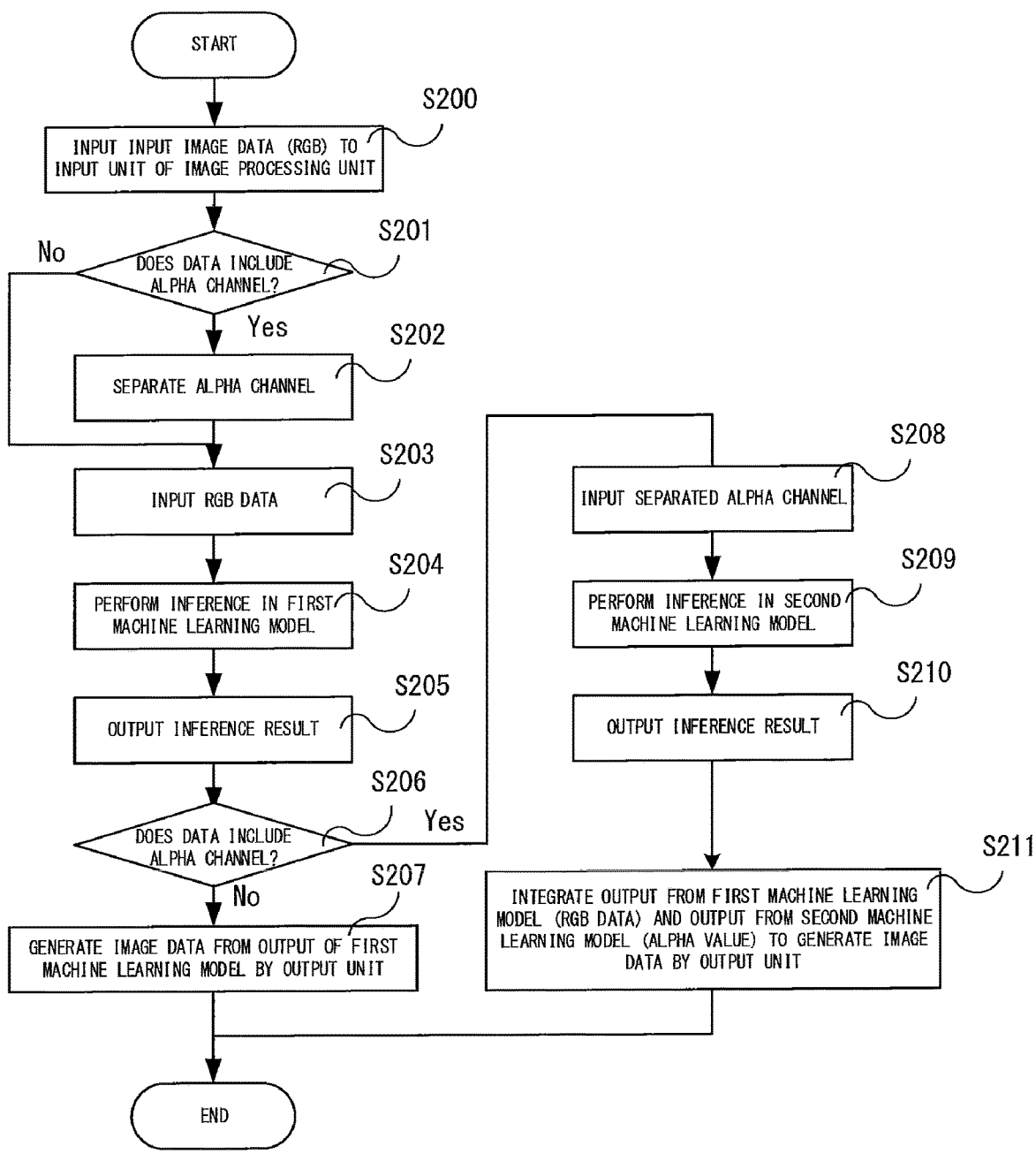
FIG. 10 is a diagram illustrating a flow at the time of performing inference by using a machine learning model shown in FIG. 9.

FIG. 9 is a functional block diagram at the time of performing inference by using machine learning models shown in FIG. 2 and FIG. 7, and FIG. 10 is a flow thereof. Functional blocks identical to respective functions in the embodiments described above are denoted by like reference signs.

First, the control unit 10 of the image processing apparatus 1 includes an inferring process executing unit 102. The inferring process executing unit 102 functions as the first machine learning model 113 and the second machine learning model 115 based on the machine learning library 1L, the definition data, and the parameter information stored in the storage unit 12. Further, the inferring process executing unit 102 has functions of the input unit 111 and the alpha-channel determining unit 131, and functions to integrate the pixel data and the alpha channel in the output unit 117.

The input unit 111 in the image processing unit 11 of the image processing apparatus 1 receives input image data (for example, RGB data) input from the storage unit 12 (Step S200). The alpha-channel determining unit 131 determines whether an alpha channel is included in the received image data (Step S201). It suffices that determination of the alpha channel is performed in such a manner that it is determined whether the image data is an image with an alpha channel, for example, by reading information of a header portion and an identifier of the image data. When the alpha channel is included in the input image data (Yes at Step S201), alpha channel data (an alpha value) is separated (Step S202). Thereafter, RGB pixel data is input to the first machine learning model 113 and inference in the machine learning model is performed (Steps S203, S204). When the alpha channel is not included in the input image data (No at Step S201), the RGB pixel data is directly input to the first machine learning model 113 and inference is performed (Steps S203, S204). An inference result in the first machine learning model 113 is output to the output unit 117 (Step S205). When the alpha channel data is not included in the input image data, the output unit 117 forms an image and outputs the image as image data (Steps S205, S206, S207).

On the other hand, when the input image data includes the alpha channel data and the alpha channel data has been separated (Yes at Step S206), an alpha value is input to the second machine learning model 115 and inference is performed (Steps S208, S209). An inference result in the second machine learning model 115 is supplied to the output unit 117 (Step S210). The output unit 117 integrates the inference result output from the first machine learning model 113 and the inference result output from the second machine learning model 115, to generate image data with the alpha channel (Step S211).

As described in the present embodiment, inference of the image data and the alpha channel can be performed to generate highly accurate image data with an alpha channel, by using the first machine learning model 113 in which learning is performed by using an inverted alpha value or image data and the second machine learning model 115 in which learning is performed by using inverted image data or an alpha value.

Inference Using Machine Learning Model of Second Embodiment

Figure 11:
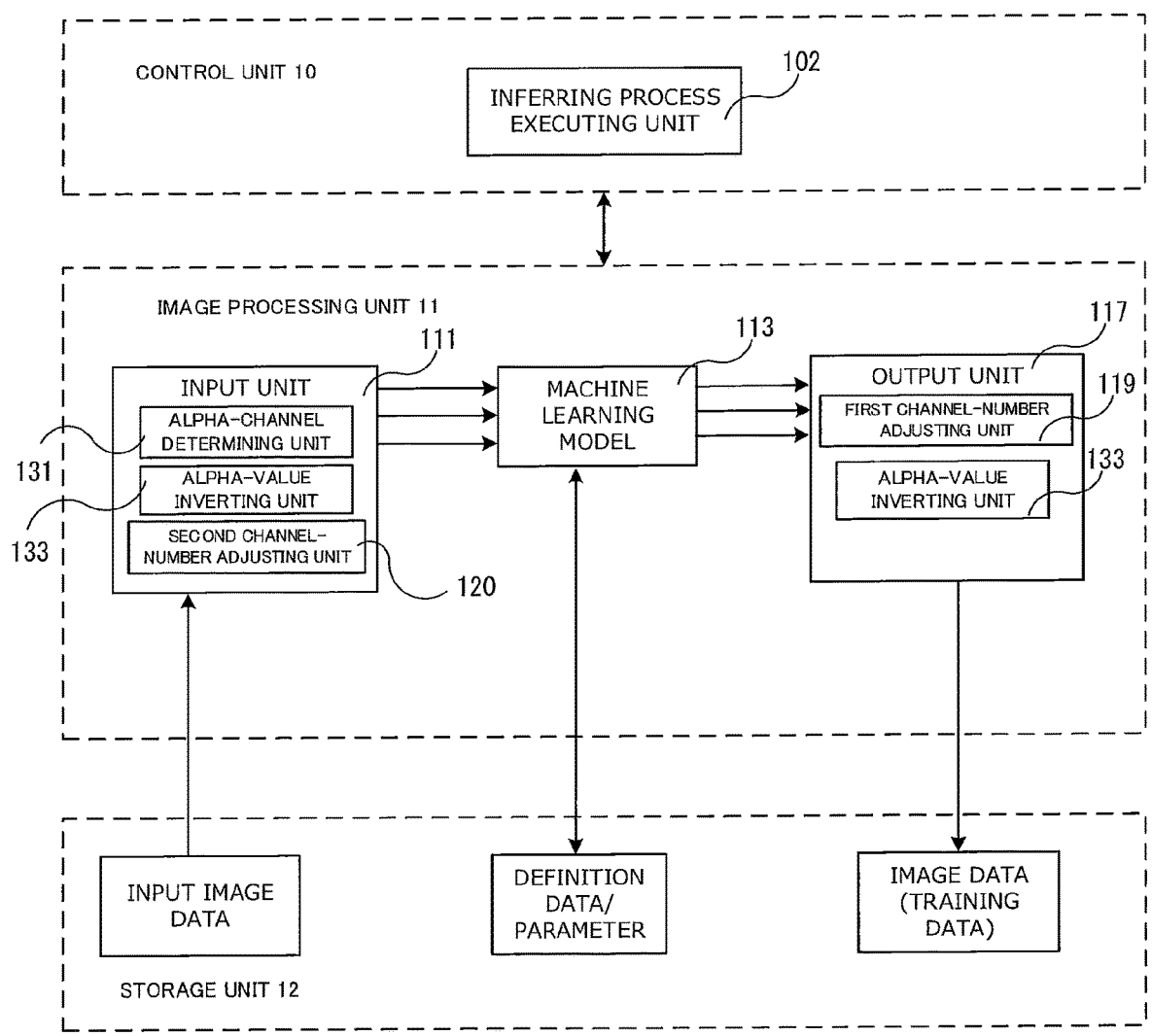
FIG. 11 is a functional block diagram at the time of performing inference by using a machine learning model shown in FIG. 5.
Figure 12:
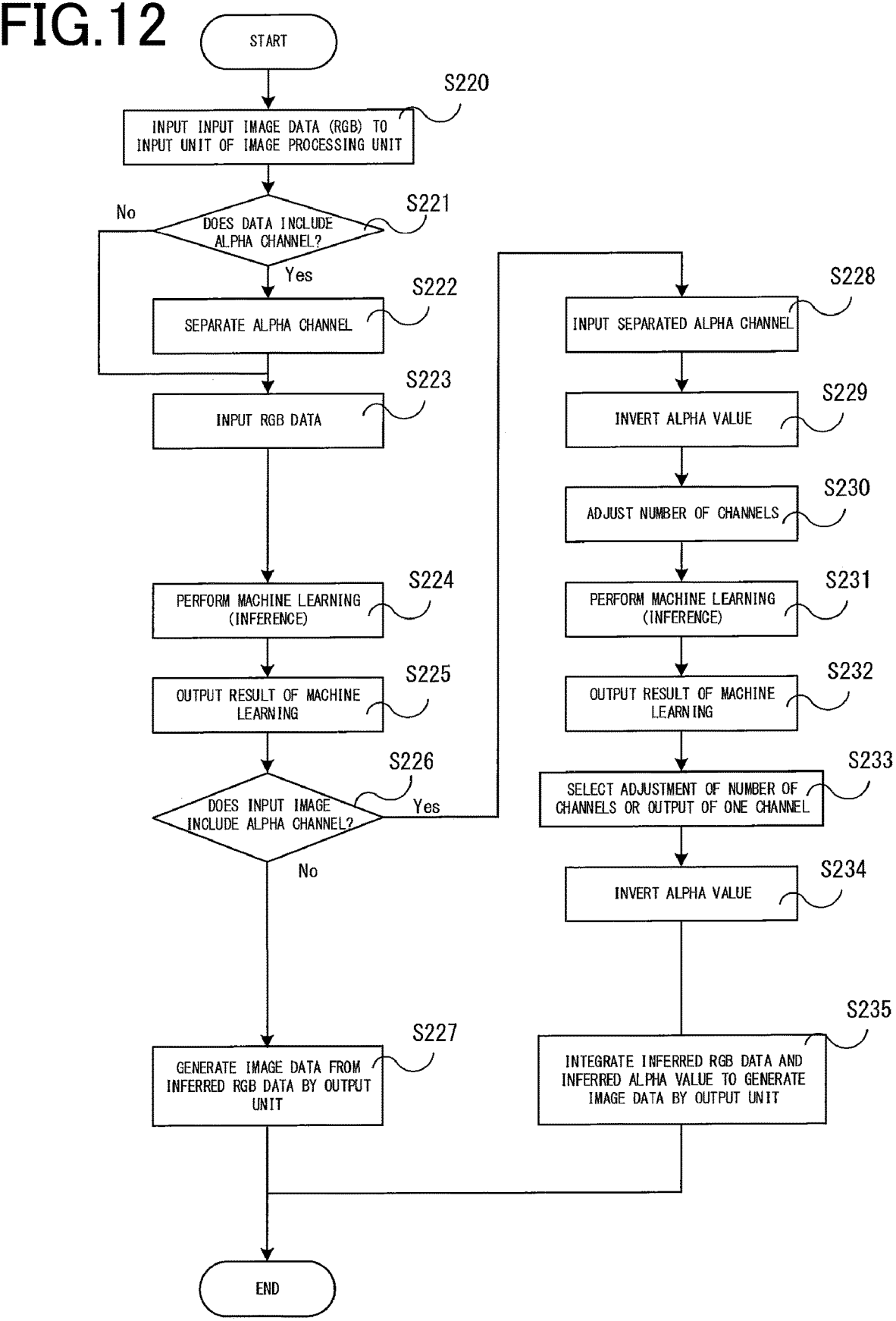
FIG. 12 is a diagram illustrating a flow at the time of performing inference by using a machine learning model shown in FIG. 11.
Figure 13:
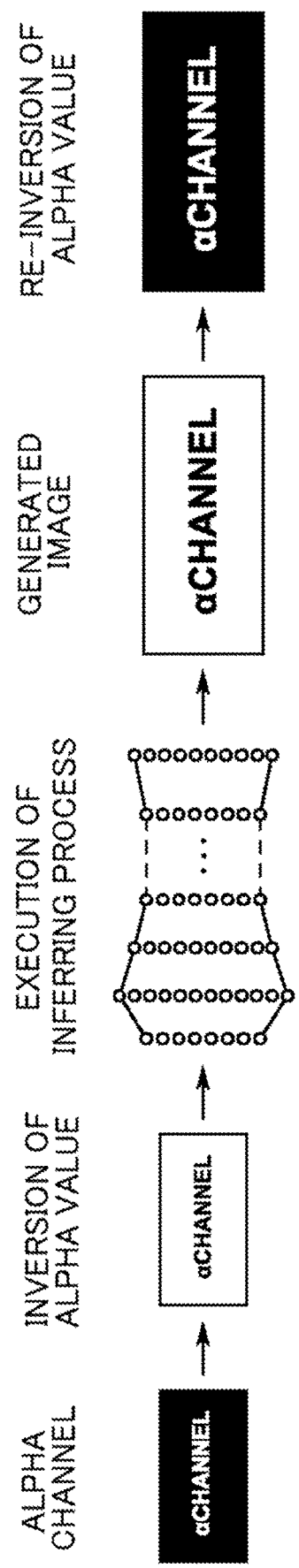
FIG. 13 is an image diagram illustrating a transition of an alpha channel in an image processing apparatus according to a modification of the present invention.
Figure 14A:
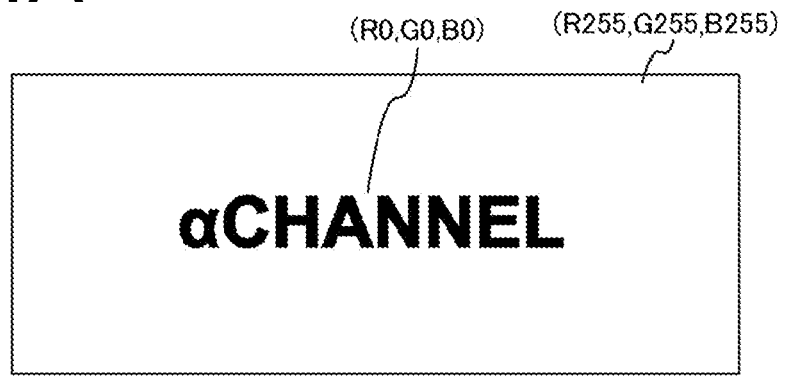
FIG. 14A and FIG. 14B are reference diagrams illustrating an example of the alpha channel.
Figure 14B:
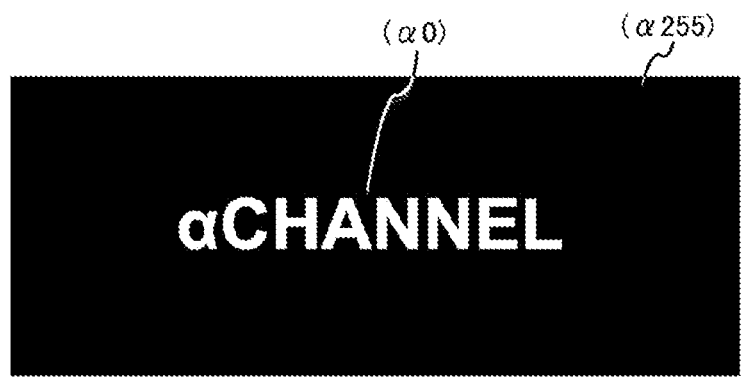
Figure 15:
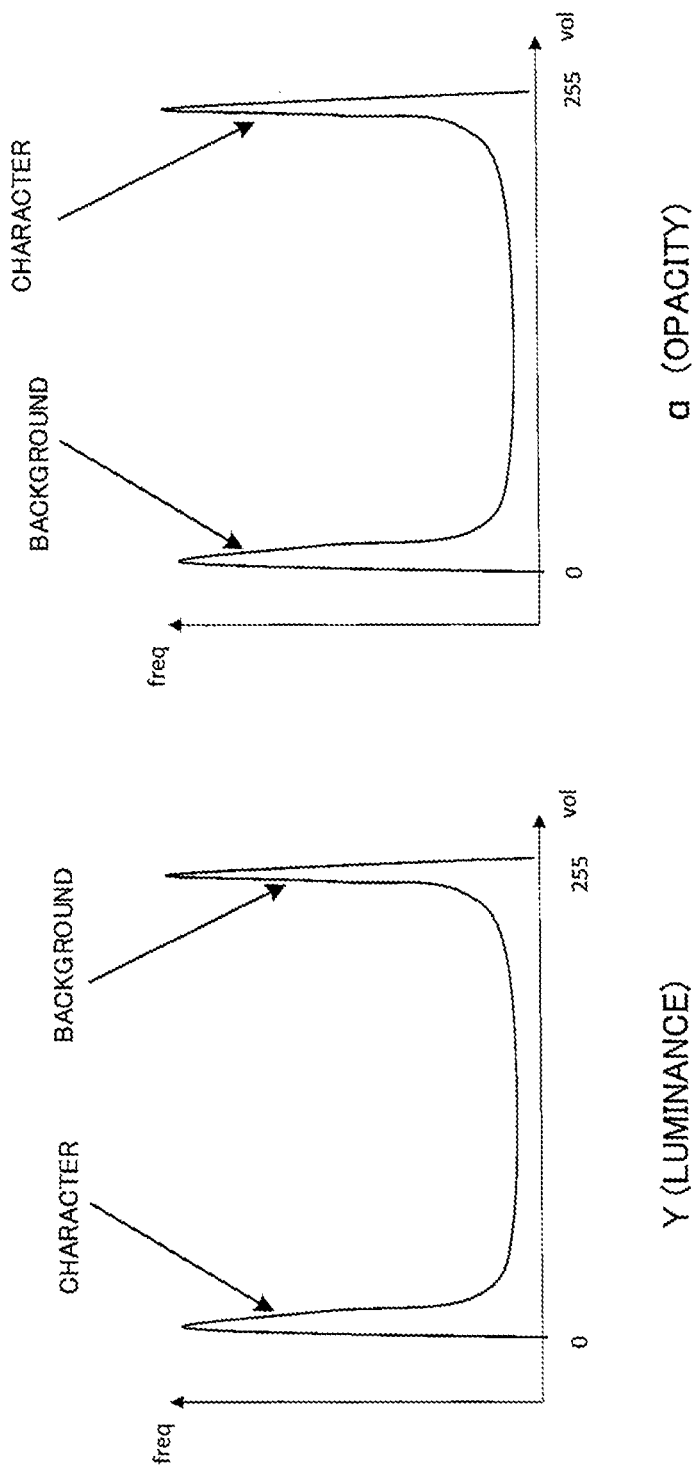
FIG. 15 is a diagram illustrating a tendency of the occurrence rate in image data and alpha channel data.

Inference by using the machine learning model of the second embodiment is described next. FIG. 11 is a functional block diagram at the time of inferring the machine learning model illustrated in FIG. 5, and FIG. 12 is a flow thereof. FIG. 13 is an image diagram illustrating a transition in an inferring process of the alpha channel, and illustrates a process to increase resolution of input data. When FIG. 5 and FIG. 11 are compared, the functional block of inference is different from that of learning in that the control unit 10 includes the inferring process executing unit 102 instead of the learning process executing unit 101. Further, the functional block of inference is different from that of learning in that the output unit 117 has a function of integrating the image data and the alpha channel data, but does not include the second channel-number adjusting unit 120, and other functions of inference are substantially the same as those of learning.

First, when image data is input to the input unit 111 of the image processing unit 11 (Step S220), the alpha-channel determining unit 131 determines whether an alpha channel is included in the input data (Step S221). When the alpha channel is included (Yes at Step S221), the alpha channel is separated from the input data (Step S222). The pixel data of the input image data is input to the first machine learning model 113, inference in the first machine learning model 113 is performed, and an inference result is supplied to the output unit 117 (Steps S223, S224, S225). When the alpha channel is not included in the input image data (No at Step S221), the RGB pixel data is directly input to the first machine learning model 113, inference is performed, and an inference result is output from the first machine learning model 113 (Steps S223, S224, S225). When the alpha channel is not included in the input image data (No at Step S226), the output unit 117 generates image data based on the inference result (Step S227).

On the other hand, when the alpha channel is included in the input image data (Yes at Step S226), the alpha channel data separated at Step S222 is inverted by the alpha-value inverting unit 133 (Steps S228, S229). The inverted data is increased to pieces of data for three channels by the second channel-number adjusting unit 120, the pieces of data are input to the first machine learning model 113, and machine learning (inference) is performed (Steps S230, S231).

The inference results for three channels in the first machine learning model 113 are grouped together in one-channel data by the first channel-number adjusting unit 119, data-inverted by the alpha-value inverting unit 133, and supplied to the output unit 117 (Steps S232, S233, S234). The output unit 117 integrates the inference result obtained by using the RGB image data in the first machine learning model 113 and the alpha value output from the alpha-value inverting unit 133 to generate output image data (Step S235).

In this manner, even in a case where a single machine learning model is used, inference is performed in the machine learning model by inverting an alpha value and adjusting the number of channels. Therefore, machine learning (inference) can be performed highly accurately also with respect to an input image having an alpha value. Further, the machine learning model to be used in the present embodiment does not need to be a model learned by using alpha-value inverted data at the time of learning, and a model learned by using only normal pixel data can be used. That is, at the time of inference, the alpha channel data is inverted and input to the machine learning model, after the number of channels is adjusted. Therefore, even the alpha channel data can be inferred in the machine learning model learned by using the pixel data.

The present invention is not limited to the configurations of the embodiments described above and various modifications can be made in a range without changing the spirit of the invention. In order to achieve the object of the present invention, the present invention can be also realized as an image processing method (a learning method and an inferring method) having characteristic constituent units included in an image processing apparatus (a learning apparatus and an inferring apparatus) as steps, or realized as a program including these characteristic steps. The program is not only stored in a ROM or the like but also can be distributed through a recording medium such as a USB memory or a communication network.

Further, the present invention can be also realized as a computer system that transmits input data to an image processing apparatus or a computer program and receives output data from the image processing apparatus or the computer program. This system is a processing system that utilizes data obtained from a machine learning model which has been learned by the processing described above, and that can provide various services. An apparatus used for this system is an image processing apparatus including a display unit and a communication unit or an information processing apparatus that can transmit and receive information to and from a computer, such as a so-called PC, a smartphone, a mobile terminal, or a game machine.

Summary of Operations and Effects of Aspect Examples of Embodiments

<First Aspect>

A learning apparatus according to a first aspect is a learning apparatus that learns a set value in a machine learning model based on predetermined image data for learning. The learning apparatus includes an inverting unit (the color inverting unit 121, the alpha-value inverting unit 133) that inverts data (color data, an alpha value) of at least a part of respective channels in the image data for learning, an input unit (111) that inputs inverted data to the machine learning model (the first machine learning model 113, the second machine learning model 115), an output unit (117) that can compare data obtained by inverting data output from the machine learning model with training data, and/or data output from the machine learning model with data obtained by inverting training data, and a learning process executing unit (101) that learns the set value according to a result of the comparison.

It is assumed a case in which a magnitude tendency of a pixel value of respective pixels is inverted with regard to color data and an alpha value (same as the embodiments). According to the first aspect, for example, by inverting color data included in image data for learning, the machine learning model (the second machine learning model 115) to which an alpha value is input at the time of inference can be learned, based on the inverted color data (see a specific example in FIG. 2 and a specific example in FIG. 7). Further, according to the first aspect, by inverting the alpha value included in the image data for learning, the machine learning model (the first machine learning model 113) to which color data is input at the time of inference can be learned based on the inverted alpha value (see a specific example in FIG. 5 and the specific example in FIG. 7). Therefore, efficient machine learning can be performed.

<Second Aspect>

The learning apparatus according to a second aspect is characterized in that the inverting unit (the alpha-value inverting unit 133) inverts data of an alpha channel (an alpha value) of respective channels of the image data for learning. According to the second aspect, in a case where the magnitude tendency of the pixel value of respective pixels is inverted with regard to the color data and the alpha value, by inverting the alpha value included in the image data for learning, the machine learning model (the first machine learning model 113), to which color data is input at the time of inference, can be learned based on the inverted alpha value (see the specific example in FIG. 5 and the specific example in FIG. 7). Therefore, efficient machine learning can be performed.

<Third Aspect>

In the learning apparatus according to a third aspect, the machine learning model is configured by either one or both of the first machine learning model (113) for learning pixel data (color data) and/or inverted data of the alpha channel (an alpha value), and a second machine learning model (115) for learning color-inverted pixel data and/or data of the alpha channel. According to the third aspect, there is an advantage in that a proper inferring process can be performed with respect to the alpha value, for example, as compared to a configuration in which the second machine learning model (115) is not provided.

<Fourth Aspect>

An inferring apparatus according to a fourth aspect is an inferring apparatus that performs a predetermined inferring process by using a machine learning model. The inferring apparatus includes an inverting unit (the alpha-value inverting unit 133) that inverts data of an alpha channel of respective channels of target image data, an input unit (111) that inputs the inverted data to the machine learning model (the first machine learning model 113), an inferring process executing unit (102) that performs the inferring process with respect to data input to the machine learning model, and a re-inverting unit (the alpha-value inverting unit 133) that inverts data having been subjected to the inferring process.

It is assumed a case in which a magnitude tendency of a pixel value of respective pixels is inverted with regard to color data and an alpha value (same as the embodiments described above). According to the fourth aspect, by inverting the alpha value included in the image data for learning, the inferring process can be performed with respect to the inverted alpha value by using a machine learning model to which color data is input. That is, there is an advantage in that a proper inferring process can be easily performed with respect to both the color data and the alpha value, without providing a machine learning model for the alpha value.

<Fifth Aspect>

A learning method according to a fifth aspect is a learning method of a set value in a machine learning model. The learning method includes inverting data of at least a part of respective channels in predetermined image data for learning (S109 in FIG. 4, S131 in FIG. 6, S161 in FIG. 8, S170 in FIG. 8), inputting the inverted data to the machine learning model (S110 in FIG. 4, S133 in FIG. 6, S162 in FIG. 8, S172 in FIG. 8), comparing data obtained by inverting data output from the machine learning model with training data (S113 in FIG. 4, S165 in FIG. 8, S176 in FIG. 8), and/or data output from the machine learning model with data obtained by inverting training data (S137 in FIG. 6), and learning the set value according to a result of the comparison (S114 in FIG. 4, S138 in FIG. 6, S158 in FIG. 8). According to the fifth aspect, effects identical to those of the first aspect can be obtained.

<Sixth Aspect>

A program according to a sixth aspect causes a computer of a learning apparatus that learns a set value in a machine learning model based on predetermined image data for learning to function as an inverting unit (the alpha-value inverting unit 133, the color inverting unit 121) that inverts data (color data or an alpha value) of at least a part of respective channels in the image data for learning, an input unit (111) that inputs the inverted data to the machine learning model (the first machine learning model 113, the second machine learning model 115), an output unit (117) that can compare data obtained by inverting data output from the machine learning model with training data, and/or data output from the machine learning model with data obtained by inverting training data, and a learning process executing unit (101) that learns the set value according to a result of the comparison. According to the sixth aspect, effects identical to those of the first aspect can be obtained.

<Seventh Aspect>

An inferring method according to a seventh aspect is an inferring method for performing a predetermined inferring process by using a machine learning model. The inferring method includes inverting data (an alpha value) of an alpha channel of respective channels in target image data (S229 in FIG. 12), inputting the inverted data to the machine learning model (the first machine learning model 113), performing the inferring process with respect to data input to the machine learning model (S231 in FIG. 12), and inverting data having been subjected to the inferring process (S234 in FIG. 12). According to the seventh aspect, effects identical to those of the fourth aspect can be obtained.

<Eighth Aspect>

A program according to an eighth aspect causes a computer of an inferring apparatus that performs a predetermined inferring process by using a machine learning model to function as an inverting unit (the alpha-value inverting unit 133) that inverts data (an alpha value) of an alpha channel of respective channels in target image data, an input unit (111) that inputs the inverted data to the machine learning model (the first machine learning model 113), an inferring process executing unit (102) that performs the inferring process with respect to data input to the machine learning model, and a re-inverting unit (the alpha-value inverting unit 133) that inverts data having been subjected to the inferring process. According to the eighth aspect, effects identical to those of the fourth aspect can be obtained.

REFERENCE SIGNS LIST 1 image processing apparatus (learning apparatus and inferring apparatus)
12 storage unit
101 learning process executing unit
102 inferring process executing unit
111 input unit
113 first machine learning model
115 second machine learning model
117 output unit
119 first channel-number adjusting unit
120 second channel-number adjusting unit
121 color inverting unit
131 alpha-channel determining unit
133 alpha-value inverting unit

What is claimed is:

1. A learning apparatus that learns a set value in a machine learning model based on predetermined image data for learning, the learning apparatus comprising:
    an inverting unit that inverts data of at least a part of respective channels in the image data for learning;
    an input unit that inputs the inverted data to the machine learning model;
    an output unit that can compare data obtained by inverting data output from the machine learning model with training data, and/or data output from the machine learning model with data obtained by inverting training data; and
    a learning process executing unit that learns the set value according to a result of the comparison.

2. The learning apparatus according to claim 1, wherein the inverting unit inverts data of an alpha channel of respective channels of the image data for learning.

3. The learning apparatus according to claim 1, wherein the machine learning model is configured by either one or both of
    a first machine learning model for learning pixel data and/or inverted data of the alpha channel and
    a second machine learning model for learning color-inverted pixel data and/or data of the alpha channel.

4. The learning apparatus according to claim 2, wherein the machine learning model is configured by either one or both of
    a first machine learning model for learning pixel data and/or inverted data of the alpha channel and
    a second machine learning model for learning color-inverted pixel data and/or data of the alpha channel.

5. An inferring apparatus that performs a predetermined inferring process by using a machine learning model, the inferring apparatus comprising:
    an inverting unit that inverts data of an alpha channel of respective channels of target image data;
    an input unit that inputs the inverted data to the machine learning model;
    an inferring process executing unit that performs the inferring process with respect to data input to the machine learning model; and
    a re-inverting unit that inverts data having been subjected to the inferring process.

6. A learning method of a set value in a machine learning model, the learning method causing a computer to realize:
    inverting data of at least a part of respective channels in predetermined image data for learning;
    inputting the inverted data to the machine learning model;
    comparing data obtained by inverting data output from the machine learning model with training data, and/or data output from the machine learning model with data obtained by inverting training data; and
    learning the set value according to a result of the comparison.

7. A non-transitory recording medium for recording a computer program causing a computer of a learning apparatus that learns a set value in a machine learning model based on predetermined image data for learning to function as:
    an inverting unit that inverts data of at least a part of respective channels in the image data for learning;
    an input unit that inputs the inverted data to the machine learning model;
    an output unit that can compare data obtained by inverting data output from the machine learning model with training data, and/or data output from the machine learning model with data obtained by inverting training data; and
    a learning process executing unit that learns the set value according to a result of the comparison.

8. An inferring method for performing a predetermined inferring process by using a machine learning model, the inferring method causing a computer to realize:
    inverting data of an alpha channel of respective channels in target image data;
    inputting the inverted data to the machine learning model;
    performing the inferring process with respect to data input to the machine learning model; and
    inverting data having been subjected to the inferring process.

9. A non-transitory recording medium for recording a computer program causing a computer of an inferring apparatus that performs a predetermined inferring process by using a machine learning model to function as:
    an inverting unit that inverts data of an alpha channel of respective channels in target image data;
    an input unit that inputs the inverted data to the machine learning model;
    an inferring process executing unit that performs the inferring process with respect to data input to the machine learning model; and
    a re-inverting unit that inverts data having been subjected to the inferring process.

* * * * *